3,560,214
DYE-CONTAINING PHOTOGRAPHIC ELEMENTS
Walter Robert Ruda, Woodbury, Minn., assignor to Minnesota Mining and Manufacturing Company, St. Paul, Minn., a corporation of Delaware
Filed Mar. 7, 1968, Ser. No. 711,359
Int. Cl. G03c 1/84
U.S. Cl. 96—84                    10 Claims

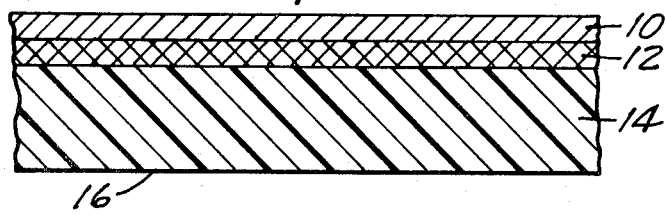
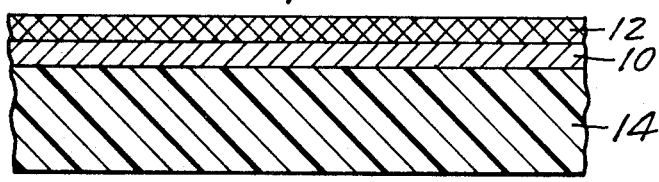
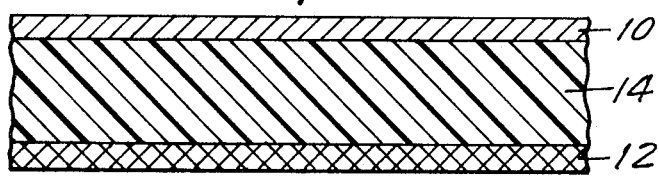
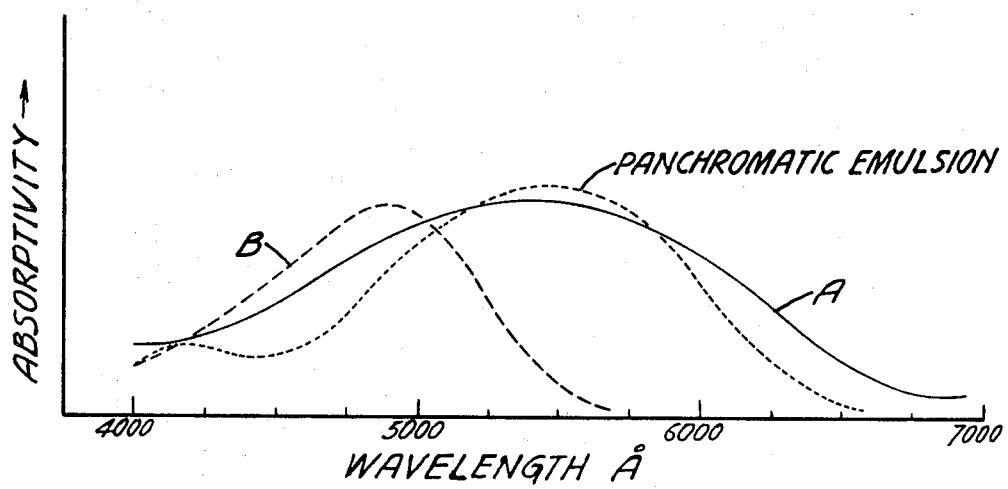
LEGEND:
A = DYE OF EXAMPLE 1
B = DYE OF EXAMPLE 2

# United States Patent Office 3,560,214
Patented Feb. 2, 1971

ABSTRACT OF THE DISCLOSURE

Photographic elements are shown which contain light absorbing dyes characterized by carboxylic acid-substituted pyrazoline nuclei. Such dyes find utility as antihalation and filter dyes, the bleachability and non-migratory characteristics of which may advantageously be altered by control of the pH of the dye environment.

---

It is known that certain light absorptive dyes may be incorporated into photographic elements for antihalation or light filtration purposes. Dye-containing media may be coated upon surfaces of photographic elements or may be incorporated within such elements as a layer or layers thereof. Examples of antihalation and light filtration dyes are found in United States Pat. Nos. 2,298,733; 2,611,696 and 3,352,680; and in British patent specification No. 584,609.

Preferably, antihalation and filter dyes contained within photographic elements should be sufficiently immobile or nondiffusing to prevent dye migration into adjacent photosensitive (e.g. silver halide) layers thereof. Excessive dye migration can cause fogging and may reduce the sensitivity of certain photosensitive materials. In addition, such dyes should undergo substantially complete bleaching during normal development processes, leaving essentially no residual stain.

Very few dye materials known to the art combine these desirable features. Those dyes which are sufficiently hydrophilic to permit ready bleaching commonly exhibit a tendency to migrate into other layers of photographic elements. Dyes which are sufficiently immobile to prevent migration usually lack the ability to be readily and completely bleached by common developer solutions.

The primary object of the present invention is to provide photographic elements containing dyes which are substantially non-migratory and yet are easily bleached.

A second object is to provide photographic elements containing dyes which may be irreversibly bleached by common photographic developer solutions.

Another object is to provide photographic elements containing dyes which exhibit desirable photo-absorption characteristics.

A further object is to provide antihalation and filter dyes which are useful in photographic elements.

It has now been discovered that the mobility and bleachability characteristics of certain pyrazoline dyes are sensitive to the pH of the dye environment. In acidic environments, such dyes are substantially immobile and non-migratory, whereas in relatively basic environments, the dyes become comparatively hydrophilic and are readily bleachable.

The dyes of the present invention are characterized by the formula:

I. 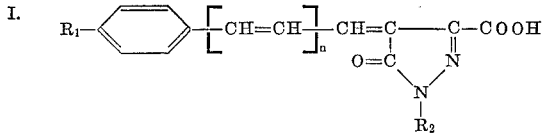

wherein $R_1$ is a tertiary amino radical and $R_2$ is a hydrogen atom, an alkyl group (e.g. methyl, ethyl, butyl), an aryl group (e.g. phenyl, tolyl, substituted phenyl, etc.), an alkaryl group or an aralkyl group. $R_1$ is preferably a dialkylamino group and most preferably is a dimethyl-amino or diethylamino group. $R_2$ preferably is a substituted aryl group and most preferably is an amino- or carboxy-substituted phenyl group, and $n$ is 0 or 1.

The carboxyl group depending from the number 3 carbon atom of the pyrazoline nucleus is believed to be critical to the operation of the dyes of the present invention, as appears below.

Many of the dyes of the present invention conveniently may be prepared by the general method of condensing in an alkanol solvent containing a small amount of trialkylamine the compounds:

II. 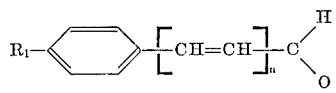

and

III. 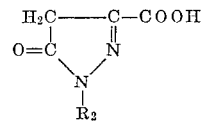

wherein $R_1$ and $R_2$ are as previously defined, and $n$ is 0 or 1.

After precipitation by acidification of the alkanol solution, the dye may be redissolved in a second alkanol solution containing a small amount of trialkylamine. This solution may then be added to a basic gelatin solution which is thereafter acidified prior to preparation of a photographic element. The substantially non-migratory free dye is thereby generated from the previously formed trialkylamine dye salt. Alternatively, the gelatin-dye solution may be introduced to a photographic element prior to acidification, the layers of the photographic element adjacent the dye layer necessarily being sufficiently acidic to cause generation of the free dye.

The pH at which transition occurs between the dye-salt and the free dye varies according to dye structure. The trialkylamine salts of the preferred dyes convert to free dyes at a pH value of about 6.

Examples of Formula II compounds include: p-dimethylaminocinnamaldehyde, p-diethylaminocinnamaldehyde, p-di-(2-hydroxyethyl)-aminocinnamaldehyde, p-dimethylaminobenzaldehyde, p-diethylaminobenzaldehyde, etc.

Examples of Formula III compounds include: 3-carboxy-1-(3'-aminophenyl)-2-pyrazoline-5-one, 3-carboxy-1-(4'-carboxyphenyl)-2-pyrazoline-5-one, 3-carboxy-1-phenyl-2-pyrazoline-5-one, 3-carboxy-1-(3'-chlorophenyl)-2-pyrazoline-5-one, 2-carboxy-1-(3'-methylphenyl)-2-pyrazoline-5-one, etc.

Although applicant does not wish to be bound by the following explanation, it is believed that the dyes of the present invention operate in the following manner.

In a basic gelatin solution prior to acidification, the dye is present as the soluble tertiary amine salt. Upon acidification of the gelatin solution, the tertiary amine salt of the dye generates the relatively insoluble and non-migratory free dye. The non-migratory characteristics of the dye are probably dependent on intersalt formation between tertiary amine groups and carboxyl groups of the dye. The tertiary amine (e.g. triethylamine) is largely lost during the preparation of the photographic element. Thereafter, upon exposure to basic developer solutions, a soluble salt is formed of the dye with a component of the developer (e.g. the sodium salt). The dye-salt consequently is readily wetted and bleached by the developer bath, the dye remnants migrating from the photographic element.

Other advantages of the present invention will be apparent from the accompanying drawing wherein:

FIGS. 1, 2 and 3 are enlarged cross-sectional views of photographic elements containing the dyes of the present invention, and FIG. 4 is a graphic representation comparing the absorption characteristics of certain preferred dyes of the present invention with the photosensitive characteristics of a common panchromatic silver halide emulsion used therewith, the measurements being made on single layers of dye or emulsion coated on suitable treated cellulose triacetate film.

Referring to FIG. 1, which illustrates a preferred embodiment of the invention, the dye layer 12 is positioned between the photosensitive layer 10 and the supporting medium 14. Dye layer 12 is thus able to absorb light which passes through photosensitive layer 10 and also light which may be reflected from, for example, interface 16, insuring against re-exposure of the photosensitive layer by the reflected light.

Another embodiment of a photographic element, wherein dye layer 12 is coated upon the back surface of supporting medium 14, is shown in FIG. 3.

Dyes of the present invention which exhibit limited spectral absorption (e.g. $n=0$) advantageously may be employed as filtering dyes. Such dyes in addition may be effectively employed as antihalation dyes for orthochromic emulsions. FIG. 2 illustrates a photographic element in which dye layer 12 is coated upon photosensitive layer 10 for the purpose of filtering out undesired wavelengths of light.

It is contemplated that the dyes of the present invention may be incorporated within other layers of a photographic element, for example, within the backing material, without departing from the scope of the invention, and in some instances it may be desirable to incorporate these dyes within the light-sensitive layer to reduce light scattering in this layer.

The spectral absorption characteristics of the dyes of the present invention may be varied by altering the number of repeating units $\{CH=CH\}$ in Formula I. For example, if the dye is 3-carboxy-1-(3'-aminophenyl)-4-(p-dimethylaminobenzylidine)-2-pyrazoline-5-one ($n=0$) described in Example 2 below, light at wavelengths between about 4000 A. and 5250 A. will be absorbed. The homolog of this dye, 3-carboxy-1-(3'-aminophenyl)-4-(p-dimethylaminocinnamylidine)-2-pyrazoline-5-one, described in Example 1 below, ($n=1$) will absorb light at wavelengths between about 4000 A. and 6500 A. FIG. 4 graphically depicts the spectral absorptivity of such dyes in comparison to the spectral photosensitivity of a sensitized common panchromatic photographic emulsion. The dye wherein $n=1$ (Curve A) absorbs substantially all wavelengths of light to which the panchromatic emulsion is sensitive and hence would find utility as an antihalation dye. The dye wherein $n=0$ (Curve B) may be used as an antihalation or filter dye, absorbing light in the blue and green portions of the spectrum only.

Antihalation dyes commonly cause an apparent loss of sensitivity in photographic elements because of the reduced amount of reflected light which strikes the photosensitive layers thereof. The migration of antihalation dyes into photosensitive layers can cause additional desensitization. When desensitization occurs, a relative indication of the effect of dye migration may be determined by physically adding known quantities of the dye to the photosensitive emulsion and measuring the sensitivity of photographic elements prepared therefrom.

The following examples are provided for illustrative purposes only and are not to be construed as limiting the scope of the present invention.

EXAMPLE 1

3-carboxy-1-(3'-aminophenyl) - 4 - (p-dimethylaminocinnamylidine)-2-pyrazoline-5-one,

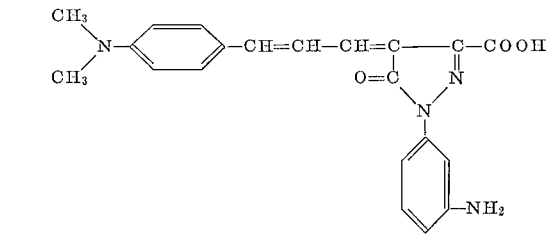

was prepared by the following method:

1.88 grams of p-dimethylaminocinnamaldehyde and 2.30 grams of 3-carboxy-1-(3'-aminophenyl)-2-pyrazoline-5-one were dissolved in 50 cc. of ethanol containing 5.0 grams of triethylamine. After refluxing for one hour, the resulting dye was precipitated by the addition of 5.0 cc. of 1.2 N hydrochloric acid. The reaction mixture was cooled to room temperature and filtered. The dye was thereafter boiled in distilled water, filtered, washed substantially acid-free with distilled water and dried. The yield was 3.5 grams of bluish-black dye.

0.54 gram of the dye, wetted with 0.25 gram of triethylamine, were dissolved in 100 cc. of methanol. The resulting triethylamine salt of this dye exhibited maximum photoabsorption at a wavelength of about 5300 A. This solution was added to 500 cc. of 5% limed ossein gelatin solution which had been adjusted to a pH of 7.0. Small amounts of saponin and formaldehyde were added as wetting and hardening agents respectively. The solution was acidified to pH 6.0 by the addition of 1.0 N sulfuric acid and was coated on cellulose triacetate film. The coated film exhibited the light-absorption characteristics illustrated by Curve A of FIG. 4.

Upon the dye containing layer was coated a silver chlorobromide light-sensitive emulsion corresponding to the "contrasty" emulsion described in Pierre Glafkides, Photographic Chemistry, (English translation), volume 1, page 347, Fountain Press, London, 1958.

The photographic element thus prepared was exposed in an imagewise manner and was developed for 5 minutes in Kodak Developer D–19 and fixed in Kodak F–5 fixing solution. No visible stains were observed. The small loss in sensitivity which was measured was small in comparison to the loss in sensitivity which normally accompanies the use of migratory dyes.

EXAMPLE 2

3-carboxy-1-(3'-aminophenyl) - 4 - (p-dimethylaminobenzylidine)-2-pyrazoline-5-one,

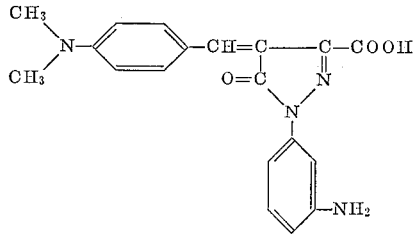

was prepared as follows:

1.5 grams of p-dimethylaminobenzaldehyde, 2.5 grams of 3-carboxy-1-(3'-aminophenyl)-2-pyrazoline-5-one, and 5.0 cc. of triethylamine were added to a reaction vessel containing 50 cc. of methanol and the solution was refluxed for 15 minutes. 30 cc. of 1.2 N hydrochloric acid were added to precipitate the dye which was then filtered, boiled in distilled water, refiltered, washed acid-free and vacuum dried at 60° C. The yield was 3.0 grams of reddish-black dye. The triethylamine salt of this dye exhibited peak absorption at about 4800 A.

An acidified gelatin solution of the dye may be prepared as in Example 1 and used as a filter layer when incorporated into a photographic element of the type illustrated in FIG. 3. The acidified gelatin solution alone, when coated onto cellulose triacetate film, exhibits spectral absorption characteristics shown by Curve B of FIG. 4.

EXAMPLE 3

3-carboxy-1-phenyl-4-(p-dimethylaminocinnamylidine)-2-pyrazoline-5-one,

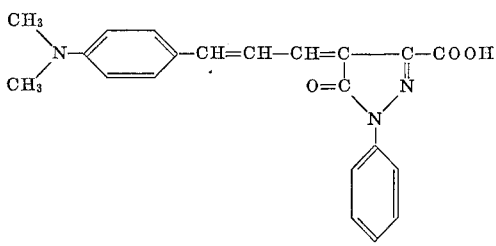

was prepared in the following manner:

9.8 grams of p-dimethylaminocinnamaldehyde and 11.0 grams of 3-carboxy-1-phenyl-2-pyrazoline-5-one were refluxed in 250 cc. of methanol for one hour. The dye was precipitated by the addition of 200 cc. of a 7.0% solution of potassium acetate in ethanol. After boiling in fresh ethanol, the precipitate was cooled to 15° C., filtered, and dried at 100° C. under vacuum for 18 hours. 14.0 grams of reddish-brown dye were produced. The subsequently prepared triethylamine salt of this dye exhibited peak absorption at about 5300 A.

The dye was incorporated into a photographic element and tested according to Example 1. Similar results were obtained.

The dye of this example in which a methyl group was substituted for the carboxyl group depending from the pyrazoline nucleus was prepared in a similar manner. It was found to be insoluble in aqueous media, such as gelatin solution. Upon exposure to the developing solution of Example 1, bleaching occurred at a greatly reduced rate.

EXAMPLE 4

3-carboxy - 1 - (4'-carboxyphenyl) - 4 - (p-dimethyl-amino-cinnamylidine)-2-pyrazoline-5-one.

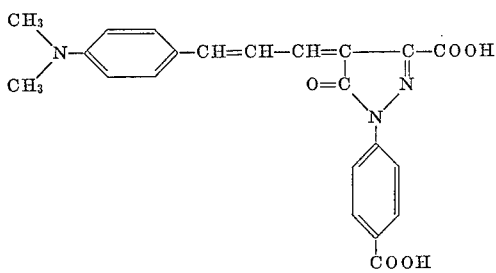

was prepared from 3-carboxy-1-(4'-carboxyphenyl)-2-pyrazoline-5-one and p-dimethylaminocinnamaldehyde by the method of Example 1. The triethylamine salt of this dye exhibited peak absorption at about 5350 A.

Incorporation of the dye into a photographic element and testing of the element were carried out as in Example 1, and similar results were obtained.

EXAMPLE 5

3-carboxy - 1 - (3' - aminophenyl-4-(p-diethylaminocinnamylidine)-2-pyrazoline-5-one,

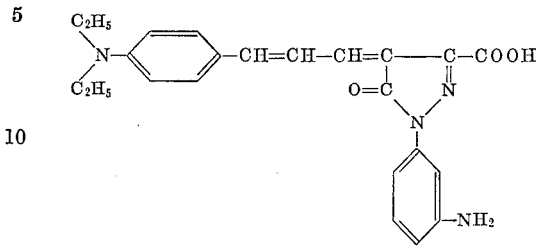

was prepared from 3-carboxy-1-(3'-aminophenyl)-2-pyrazoline-5-one and p-diethylaminocinnamaldehyde as in Example 1. The triethylamine salt of this dye exhibited peak absorption at about 5400 A.

A photographic element was produced and tested according to Example 1, yielding similar results.

Various other embodiments of the present invention will be apparent to those skilled in the art without departing from the scope thereof.

What is claimed is:

1. A photographic element comprising a photosensitive layer and a gelatino light-absorbing layer having a dye of the formula

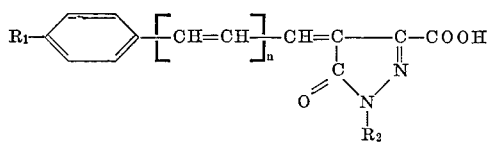

wherein $R_1$ is a dialkylamino group, $R_2$ is a hydrogen atom, an alkyl group, an aryl group, an aralkyl group, an alkaryl group, a carboxyaryl group or an aminoaryl group, and $n$ is 0 or 1, said dye in said gelatino light-absorbing layer being non-migratory in acidic environments and being bleachable in basic photographic developers.

2. A photographic element comprising a support, at least one photosensitive layer and at least one gelatino light-absorbing layer containing a dye of the general formula

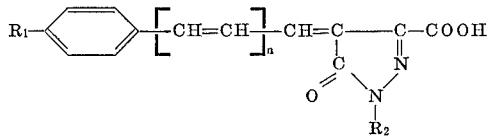

wherein $R_1$ is a dialkylamino group, $R_2$ is a hydrogen atom, an alkyl group, an aryl group, an aralkyl group, an alkaryl group, a carboxyaryl group or an aminoaryl group, and $n$ is 0 or 1, said dye in said gelatino light-absorbing layer being non-migratory in acidic environments and being bleachable in basic photographic developers.

3. A photographic element of claim 1 wherein said $R_1$ is a dialkylamino group containing less than seven carbon atoms.

4. A photographic element of claim 2 wherein said photosensitive layer contains a silver halide emulsion and wherein said $R_1$ group is a dimethylamino or a diethylamino group.

5. A photographic element of claim 1 wherein said dye is 3-carboxy-1-(3'-aminophenyl) - 4 - (p - dimethylaminocinnamylidine)-2-pyrazoline-5-one.

6. A photographic element of claim 1 wherein said dye is 3-carboxy - 1 - phenyl - 4 - (p - dimethylaminocinnamylidine)-2-pyrazoline-5-one.

7. A photographic element of claim 1 wherein said dye is 3-carboxy-1-(4'-carboxyphenyl) - 4 - (p - dimethylaminocinnamylidine)-2-pyrazoline-5-one.

8. A photographic element of claim 1 wherein said dye is 3-carboxy-1-(3' - aminophenyl) - 4 - (p - dimethylaminobenzylidine)-2-pyrazoline-5-one.

9. A photographic element comprising a support, at least one silver halide emulsion layer and at least one gelatino light-absorbing layer containing a dye of the formula

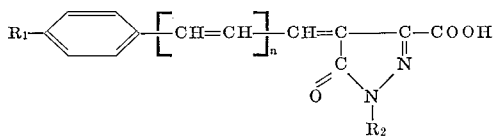

wherein $R_1$ is a dialkylamino group, $R_2$ is a hydrogen atom, an alkyl group, an aryl group, an aralkyl group, an alkaryl group, a carboxyaryl group or an aminoaryl group, and $n$ is 0 or 1, said dye in said gelatino light-absorbing layer being non-migratory in acidic environments and being bleachable in basic photographic developers.

10. In a photographic element having a support and a photosensitive layer, the improvement comprising a gelatino light-absorbing layer containing a dye of the formula

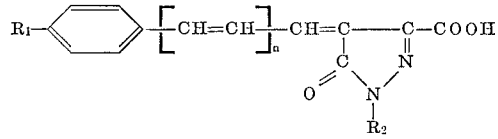

wherein $R_1$ is a dialkyl amino group, $R_2$ is a hydrogen atom, an alkyl group, an aryl group, an aralkyl group, an alkaryl group, a carboxyaryl group or an aminoaryl group, and $n$ is 0 or 1, said dye in said gelatino light-absorbing layer being non-migratory in acidic environments and being bleachable in basic photographic developers.

References Cited
UNITED STATES PATENTS
3,002,837  10/1961  Burgardt et al. _____ 96—84

FOREIGN PATENTS
596,917  8/1959  Italy _____ 96—84
886,651  7/1943  France _____ 96—84

RONALD H. SMITH, Primary Examiner

U.S. Cl. X.R.

117—33.3; 252—300